United States Patent [19]

Williams et al.

[11] Patent Number: 4,840,819
[45] Date of Patent: Jun. 20, 1989

[54] METHOD FOR PREPARING COMPOSITE MEMBRANES FOR ENHANCED GAS SEPARATION

[75] Inventors: Samuel C. Williams, Canton; Benjamin Bikson, Brookline; Joyce K. Nelson, Lexington; Robert D. Burchesky, Norwood, all of Mass.

[73] Assignee: Union Carbide Corporation, Danbury, Conn.

[21] Appl. No.: 35,781

[22] Filed: Apr. 8, 1987

[51] Int. Cl.$^4$ .................... B05D 5/00; B05D 3/00
[52] U.S. Cl. .................... 427/245; 210/490; 210/500.23; 427/322
[58] Field of Search .................. 210/490, 500–523; 264/41; 427/245, 246, 412.1, 322

[56] References Cited

U.S. PATENT DOCUMENTS

| | | | |
|---|---|---|---|
| 3,133,132 | 5/1964 | Loeb et al. | 264/49 |
| 3,762,566 | 10/1973 | Del Pico | 210/490 |
| 3,808,303 | 4/1974 | Ganci et al. | 264/41 |
| 3,842,515 | 10/1974 | MacDonald et al. | 34/9 |
| 3,912,834 | 10/1975 | Imai et al. | 210/490 X |
| 4,080,744 | 3/1978 | Manos | 34/9 |
| 4,127,625 | 11/1978 | Arisaka et al. | 264/28 |
| 4,230,463 | 10/1980 | Henis et al. | 55/16 |
| 4,239,714 | 12/1980 | Sparks et al. | 264/45.5 |
| 4,243,701 | 1/1981 | Riley et al. | 427/244 |
| 4,467,001 | 8/1984 | Coplan et al. | 427/434.6 |
| 4,527,999 | 7/1985 | Lee | 55/16 |
| 4,602,922 | 7/1986 | Cabasso et al. | 55/158 |
| 4,629,563 | 12/1986 | Wrasidlo | 210/500.34 |

FOREIGN PATENT DOCUMENTS 0175668  3/1986  European Pat. Off. .

OTHER PUBLICATIONS

Weller, S. and Steiner, W. A., "Separation of Gases by Fractional Permeation Through Membranes," *Journal of Applied Physics*, vol. 21, Apr., 1950, pp. 279–283.

Cabasso, I. and Tamvaris, A. P., "Composite Hollow Fiber Membranes," *Journal of Applied Polymer Science*, vol. 23, pp. 1509–1525 (1979).

"Development of Novel Porous Substrates for Ultrafiltration, Desalination and Water Reclamation-Part III," Final Report, Contract No. 14-34-0001-0523, Gulf South Research Institute, May 1982.

*Primary Examiner*—Evan Lawrence
*Attorney, Agent, or Firm*—Alvin H. Fritschler

[57] ABSTRACT

Composite membranes having advantageous combinations of selectivity and permeability are prepared by the coating of a separation layer on a porous support layer containing a controlled amount of liquid in the range of from about 10% to about 90% by weight of the liquid present in the fully wet support layer.

18 Claims, No Drawings

METHOD FOR PREPARING COMPOSITE MEMBRANES FOR ENHANCED GAS SEPARATION

BACKGROUND OF THE INVENTION

1. Field of the Invention

The invention relates to permeable membranes for the separation of fluid mixtures. More particularly, it relates to composite membranes having enhanced separation/permeability characteristics and methods for their preparation.

2. Description of the Prior Art

Permeable membranes capable of selectively permeating one component of a fluid mixture, either gas or liquid, are considered in the art as a convenient, potentially highly advantageous means for achieving desirable fluid separations. For practical commercial operations, permeable membranes must be capable of achieving an acceptable level of selectivity of separation of the gases or liquids contained in a feed stream while, at the same time, achieving a desirably high productivity of fluid separation.

Various types of permeable membranes have been proposed in the art for the carrying out of a variety of fluid separation operations. Such membranes can generally be classified as being of the (1) isotropic, (2) asymmetric or (3) composite type. The so-called isotropic and asymmetric type membranes are comprised essentially of a single permeable membrane material capable of selectively separating desired components of a fluid mixture. Isotropic membranes have the same density throughout the thickness thereof. Such membranes generally have the disadvantage of low permeability, i.e. low permeate flux, due to the relatively high membrane thickness necessarily associated therewith. Asymmetric membranes are distinguished by the existence of two distinct morphological regions within the membrane structure. One such region comprises a thin, dense semipermeable skin capable of selectively permeating one component of a fluid mixture. The other region comprises a less dense, porous, non-selective support region that serves to preclude the collapse of the thin skin region of the membrane under pressure.

Composite membranes generally comprise a thin layer or coating of a suitable permeable membrane material superimposed on a porous substrate. The separation layer, which determines the separation characteristics of the composite structure, is advantageously very thin so as to provide the desirably high permeability referred to above. The substrate only serves to provide a support for the thin membrane layer positioned thereon.

As the advantages of permeable membranes have become increasingly appreciated in the art, the performance requirements of such membranes have likewise increased. Thus, the art is moving in the direction of very thin membranes having desirable permeability characteristics without sacrifice of the separation, or selectivity, characteristics of the hollow fiber or other permeable membrane structure. It is thus increasingly desired that more advantageous combinations of permeability and selectivity be achieved with respect to a variety of fluid separations of commercial interest. As indicated above, isotropic-type membranes are not generally suitable for the achieving of such requirements. Asymmetric membranes, on the other hand, can be developed for such practical fluid separation applications, but do not possess an inherent flexibility enabling them to be readily optimized for particular fluid separation applications. While the thin dense, semipermeable layer of a particular asymmetric membrane material can be made thinner for increased permeability, the selectivity characteristics of said material, unless modified by particular treatment techniques, may be no more than adequate with respect to the separation of the components of a fluid mixture being treated in a particular application.

The thin skin of such asymmetric membranes, which are described in the Loeb patent, U.S. Pat. No. 3,133,132, is frequently found not to be sufficiently perfect for gas separation operations, but to contain various imperfections or defects. Such defects, in the form of residual pores, minute pinholes and the like, comprise relatively large size openings through which a fluid mixture will preferentially flow. As a result, a significantly reduced amount of fluid separation will occur as a result of the presence of such defects in the membrane structure. In the case of asymmetric polysulfone hollow fibers, such defects result in the selectivity (as defined below) being only in the range of about 1–1.5 as contrasted to a selectivity of about 6.0 for polysulfone that is free of defects. In a proposed solution to this problem, Henis et al., U.S. Pat. No. 4,230,463, disclosed an asymmetric membrane coated with a material having a determined intrinsic separation factor that is less than that of the material of the separation membrane and exhibiting a separation factor significantly greater than the determined intrinsic separation factor of the coating material and greater than that of the uncoated separation membrane. Using this approach, silicone, having a selectivity of about 2, can be coated on polysulfone hollow fibers to increase the selectivity thereof from the 1–1.5 range indicated above to from 2 to 6, with such selectivity commonly approaching 6. The permeability (as defined below) of such silicone/polysulfone composites have generally been relatively low, i.e. about 0.2 ft.$^3$ (STP)/ft.$^2$. day . psi or less, leading to the desire for thinner membranes, i.e. thinner dense skins, particularly in light of the increasing requirements in the art for high flux operation. Thinner membranes lead, however, to an increase in the number of defects that require curing to achieve acceptable performance. While efforts to improve this approach continue, there remains a desire in the art for other approaches to provide a desirable combination of selectivity and permeability for practical commercial operation. For such reasons, composite membranes, utilizing membrane materials selected particularly for a desired gas or other fluid separation, offer the greatest opportunity, with respect to particular gas separations of commercial interest, for the achieving of desirable combinations of selectivity and permeability. The requirements for composite membranes are not only that the separation layer be very thin, but that the material of the separation layer be optimized for the desired fluid separation application. One such application of significant commercial interest is air separation, particularly wherein the membrane material selectively permeates oxygen for recovery as an oxygen-enriched permeate gas, with a nitrogen-enriched stream being withdrawn as non-permeate gas. There is a genuine need and desire in the art, therefore, to develop a composite-type membrane particularly suitable for air separation hydrogen-methane, hydrogen-nitrogen, carbon dioxide-methane separations, and other desirable gas separation operations.

Such composite membranes are also desired in fluid separation processes that involve a phase change of one or more components of the mixture to be separated. The feed and the permeate streams are thus alternately in the liquid and gaseous state in such processes, with gas being present on one side of the membrane. An example of such a process is pervaporation through membranes, which is particularly useful in the separation of liquids from their azeotrope solvent mixtures, and wherein liquid is present on the feed side of the membrane. Another such process is perstruction, wherein liquid is present on the permeate side of the membrane.

It is an object of the invention, therefore, to provide a composite membrane having an advantageous combination of selectivity and permeability for desired gas, pervaporation or perstruction separation operations.

It is a further object of the invention to provide a process for the preparation of composite membranes having such advantageous combination of selectivity and permeability for desired gas, pervaporation or perstruction separations.

It is another object of the invention to provide a composite membrane particularly suitable for air separation applications.

With these and other objects in mind, the invention is hereinafter described in detail, the novel features thereof being particularly pointed out in the appended claims.

SUMMARY OF THE INVENTION

Composite permeable membranes are prepared by applying a thin coating of a permeable membrane material to a porous base material having a controlled amount of liquid incorporated therein. The composite membranes of the invention will have an advantageous combination of selectivity and permeability. An ethyl cellulose/polysulfone composite membrane, preferably prepared by applying a coating of ethyl cellulose to a hollow fiber polysulfone substrate in this manner, constitutes a highly desirable composite membrane for use particularly in air separation operations.

DETAILED DESCRIPTION OF THE INVENTION

For air separation applications, the objects of the invention are desirably accomplished by the effective utilization of a membrane material having desirable selectivity for air separation, but not heretofore used in practical commercial air separation operations because economically attractive oxygen permeation rates were not achieved. Such membrane material, i.e. ethyl cellulose, has been found suitable, in the practice of the invention, not only as the separation layer in composite membranes having acceptably high permeability characteristics, but also, in preferred embodiments of the invention, having very high, enhanced permeability combined with the desirable selectivity characteristics of the ethyl cellulose membrane material. Such ethyl cellulose is desirably coated on a hollow fiber polysulfone substrate, as herein described, to form a unique hollow fiber composite membrane structure providing an advantageous combination of selectivity and permeability, enhancing the desirability of utilizing permeable membranes in the air separation field.

The invention is further described herein, for convenience of description, with particular reference to such ethyl cellulose/polysulfone hollow fiber composite membranes. It will be understood, however, that the scope of the invention is not limited to the use of this particular composite membrane combination, or to the carrying out of air separation applications therewith, or to the use of composite membranes in hollow fiber form. To the contrary, it is within the scope of the invention to employ the ethyl cellulose/polysulfone or other composite membrane compositions prepared as herein provided for a variety of desired fluid separation operations apart from said air separation for which the unique ethyl cellulose/polysulfone composition is particularly suited. In addition, such composite membrane compositions can be prepared, in accordance with the invention, in spiral wound, flat sheet or other desired forms as well as in said hollow fiber form.

Those skilled in the art will appreciate that ethyl cellulose is well known as a membrane material having desirable gas separation properties. Thus, Weller and Steiner, in the Journal of Applied Physics, Vol. 21, April 1950, pp. 279-283, disclose that ethyl cellulose possesses selectivity characteristics with respect to the constituents of air, being selectively permeable with respect to oxygen rather than nitrogen. Nevertheless, dense or even thin isotropic films of ethyl cellulose have not been suitable for economical air separation operations because of the low oxygen permeation rates associated therewith. Because of the good selectivity characteristics of this membrane material, however, other efforts have been made to develop an ethyl cellulose gas permeation membrane possessing desirably high permeability characteristics for use in practical air and other useful gas separation operations. Arisaka et al., U.S. Pat. No. 4,127,625, confirming that desirable gas permeability had not been achieved in the asymmetric hollow fiber membranes of the art, disclose improvements in the characteristics of hollow fibers prepared from cellulose derivatives, such as cellulose acetate and ethyl cellulose, wherein a film of a film forming polymer is coated on the exterior surface of the hollow fiber prepared by a particular extrusion technique. The thus coated hollow fiber comprises an asymmetric membrane when the same cellulose derivative is employed in the hollow fiber and in the film coated thereon. Said coated hollow fiber comprises a composite membrane when different cellulose derivatives are employed, e.g. when ethyl cellulose is coated on a cellulose acetate fiber. The patent discloses that the concentration of the film-forming polymer in the coating solution should be 0.2-5 wt. %, providing a film having a thickness in the range of 0.1-300μ, as lower concentrations do not improve the gas separating capacity of the resulting increase in the thickness of the film and a corresponding reduction in gas permeability. Arisaka et al. disclose about a fifty time increase in the gas permeability of an ethyl cellulose coated hollow fiber over that of a comparative sample of an ethyl cellulose hollow fiber of a homogeneous, i.e. isotropic, nature, as determined with respect to hydrogen, nitrogen, oxygen and carbon dioxide. Despite such improved permeability, however, ethyl cellulose-containing membranes have still not been found, apart from the subject invention, to possess a requisite combination of selectivity and permeability for advantageous use in practical, commercial air or other fluid separation operations.

As indicated above, composite membranes formed by the application of a thin coating of ethyl cellulose to a hollow fiber polysulfone substrate have been found to possess the desirable separation characteristics of ethyl cellulose together with oxygen permeation characteristics acceptable for air separation operations. The obtaining of such a desirable combination of properties is illustrated in Example 1 below.

EXAMPLE 1

Polysulfone hollow fibers, prepared as described below and after being completely dried at 120° C. by passage through a hot-air drying column, were tested with air as a feed gas at 100 psig and 25° C. and exhibited a permeation rate of 21.4 ft.$^3$ (STP)/ft.$^2$ . day . psi, with no apparent gas selectivity. Said dried fibers were coated with an ethyl cellulose polymer solution, essentially employing the coating, drying and curing technique disclosed below. The ethyl cellulose solution was prepared by dissolving 1.0% ethyl cellulose in isopropanol, and was filtered through a 1.5μm glass filter prior to application to the polysulfone hollow fibers. The resulting hollow fiber composite membrane, having an ethyl cellulose membrane material coating thickness of about 0.2μ, was tested for air separation at 100 psi and 25° C. The selectivity between oxygen and nitrogen was 3.8, and the permeation rate of the more permeable oxygen was on average about 0.23 ft.$^3$ (STP)/ft.$^2$ . day . psig. As used herein, it will be understood that the selectivity, or separation factor, of a membrane or membranes module assembly represents the ratio of the permeate rate of the more permeable to the less permeable component of a mixture being separated. Those skilled in the art will appreciate that said selectivity of about 3.8 approximates the intrinsic selectivity of ethyl cellulose between oxygen and nitrogen.

The conventional composite membrane approach, to which the invention is directed, will be understood to rely upon the separation characteristics of the coating material rather than of the substrate, as in the Henis et al. approach referred to above with respect to the curing of defects in asymmetric membranes. As indicated above, the composite membrane approach enables the greatest flexibility in achieving desirable combinations of separation and permeability for particular gas separation operations. In specific embodiments of the invention, ethyl cellulose can be employed as the membrane coating material, and the separation characteristics of the composite are essentially those of ethyl cellulose. Thus, ethyl cellulose material, free of defects, has an intrinsic selectivity of about 3.8, and the composites of the invention, as in Example 1 above, can achieve a selectivity of approximately 3.8. It should be understood in this regard that, as coating layers are made thinner and thinner for purposes of increasing the permeability of a composite membrane structure, some decrease in selectivity will occur, as in the case of asymmetric membranes as discussed above. As such defects in the membrane layer must coincide with the porosity of the substrate layer for preferential flow of the feed gas therethrough, the loss of selectivity because of defects will generally be less in the case of composite membranes than occurs in the case of asymmetric membranes. Nevertheless, it will be appreciated that the selectivity of the ethyl cellulose-polysulfone composites of the invention may be 3.7, or 3.6 or less depending on the thickness of the ethyl cellulose membrane layer and other factors pertaining to any particular ethyl cellulose composite membrane and separating module preparation operation. For purposes of the composite membranes of the invention, it is significant to note that the selectivity of the membrane layer can be essentially achieved, i.e. about 3.8-3.9 for the ethyl cellulose embodiments of the invention, while at the same time, achieving acceptably high permeability characteristics of the composite membrane as to render the composites desirable for practical commercial operations. Thus, composite ethyl cellulose hollow fibers, such as those of the example above, generally exhibit a permeability of about 0.25 ft.$^3$(STP)/ft.$^2$ . day . psi., and the selectivity-permeability combination of about 3.8-0.25 is such as to render ethyl cellulose suitable as a membrane material in a manner not heretofore achieved in such practical commercial operations. As will be further described with respect to other embodiments of the invention, highly advantageous combinations of selectivity and permeability can also be achieved, further enhancing the desirability of ethyl cellulose-polysulfone hollow fiber composites for air separation and for other significant gas or other fluid separation operations.

The polysulfone or other hollow fiber substrates employed in the practice of particular embodiments of the invention can be prepared in accordance with conventional techniques well known in the art. Hollow fibers are generally spun from a dope composition of the desired fiber polymer, quenched and washed. As disclosed by Cabasso et al. in "Composite Hollow Fiber Membranes", Journal of Applied Polymer Science, Vol. 23, 1509-1525 (1979), polysulfone hollow fibers can be spun from a ternary solution of polysulfone, poly(vinylpyrrolidone) and dimethylacetamide, with the total polymeric concentration in the solution desirably being 40-52 wt. %, and the polysulfone/poly(vinylpyrrolidone) ratio being 1.5-2.0. The well known tube-in-tube jet technique is disclosed as being suitable for the spinning procedure, with water at about 21° C. being the preferred outside quench medium for the fibers. The quench medium in the center of the fiber is desirably air. Quenching is followed by washing the fibers, conveniently with hot water at about 50°-60° C. Following such washing, the hollow fibers are dried prior to being coated with the membrane material to form the desired composite membrane. For this purpose, the polysulfone hollow fibers are typically dried by passage through a hot air drying column for a suitable period of time.

The dried polysulfone hollow fiber is coated with ethyl cellulose or other desired membrane material in a coating and drying, sequence. This coating and drying sequence conveniently comprises the technique used in Example 1 above and described in the Coplan et al. patent, U.S. Pat. No. 4,467,001. Thus, the dried hollow fiber is passed through the coating solution contained in a coating vessel, and is then passed through a dryer oven and a cure oven for contact with drying air or other suitable gas, and higher temperature curing air or other gas prior to being taken up on a winder or otherwise being processed or stored for eventual incorporation in membrane modules suitable for use in commercial gas separation operations. For the coating of polysulfone hollow fibers with ethyl cellulose, it is generally desirable to employ drying temperatures of from about 20° C. to about 120° C. For other coating materials, the drying and curing conditions will be adapted to the requirements of the particular materials being employed. Those skilled in the art will appreciate that it is also possible to dry the separation layer on the support layer without employing the separate curing step described above.

It has been determined that the separation characteristics of the membrane material used in the separation layer can be substantially maintained, and the permeability of the composite can be very significantly enhanced, in preferred embodiments of the invention, by a change in the step of drying the hollow fibers prior to the coating thereof. In the case of the ethyl cellulose/polysulfone hollow fiber composite discussed above, such preferred embodiments enable the selectivity of about 3.8 to be maintained in air separation operations, while the permeability of the composite is increased from about 0.2 to about 0.5. Such improvement, combining a retention of the selectivity of the ethyl cellulose with a two-fold increase in permeability, represents the highly advantageous combination of selectivity and permeability referred to above obtainable in such preferred embodiments of the invention. In the practice of such embodiments, the hollow fibers are not completely dried, as in conventional practice, but are only partially dried so as to retain small amounts of liquid in the hollow fiber substrate material. Such liquid is preferably a combination of solvent and non-solvent for the intended coating material. For the ethyl cellulose/polysulfone composite, such liquid is conveniently an alcohol and water mixture, although any suitable liquids, e.g. alcohol, hexane or cyclohexane, can be employed in the washing of the substrate and retained in small amounts upon the partial drying of said substrate prior to the coating operation.

In the practice of the preferred embodiment of the invention, the hollow fiber or other substrate material is subject to a partial drying operation in which a small amount of residual liquid is retained in the substrate material. While the amount of liquid thus retained will vary depending on the particular substrate and composite membrane employed, and the requirements of a given fluid separation operation employing said membrane, the amount of liquid retained in the substrate upon completion of the partial drying step of the invention will generally range from about 10% to about 90%, preferably from about 40% to about 60%, by weight of the liquid present in the fully wet substrate prior to drying. Lesser amounts of residual liquid will normally not have a significant effect on the structure and properties of the composite membrane prepared therefrom, while the presence of larger amounts of liquid, as in a fully wet substrate, will tend to adversely affect the selectivity characteristics of the composite membrane produced therefrom. Those skilled in the art will appreciate that the partial drying operation can be carried out by any suitable time-temperature regime in conventional apparatus. As will be seen by the illustrative examples below, it is convenient to pass the substrate through a drying column, or heating oven, as in the embodiments in which conventional, essentially complete drying is achieved, e.g., Example 1, but at a lower drying temperature. It would also be possible to operate at the more conventional drying temperatures, but with a shorter retention time in the drying column, or to employ a combination of lower temperatures and shorter retention time such as to achieve the desired partial drying effect. It will be appreciated that the amount of residual liquid retained in the substrate upon completion of the partial drying step of the invention can readily be determined from relative weight measurements of the partially dried and completely dry substrate.

When the substrate is partially dried as herein disclosed prior to the application of a very thin coating of membrane material, it has thus been found that the separation layer of the composite, upon the curing thereof, will retain its desirable selectivity characteristics, while the permeability of the thus-prepared composite membrane will be enhanced. In certain embodiments of the invention, residual liquid retained in the partially dried substrate comprises one or more liquids that are solvents for the membrane material of the separation layer to be coated on the partially dried substrate. Such solvent liquids are conveniently conventional alcohols, such as ethanol, isopropanol and the like, although other suitable solvent liquids can also be employed. In other embodiments, said residual liquid is not simply a solvent for said membrane coating material, but comprises a combination of solvent and non-solvent components. For example, said liquid combination may combine alcohols, such as those indicated above, together with non-solvents, such as water, or hexane, cyclohexane or mixtures thereof. In still other embodiments, the residual liquid may comprise a non-solvent for said membrane coating. Said hexane, cyclohexane, or water are illustrative examples of convenient non-solvent residual liquids that may be retained in the substrate in the partial drying step of the invention. It should be noted that, when a non-solvent liquid or a liquid with substantially non-solvent solubility characteristics is thus retained, it is generally desirable to retain a lesser amount of said liquid than that commonly retained in the case of solvent or solvent and non-solvent liquid mixtures. Thus, the amount of such non-solvent or liquid with substantially non-solvent solubility characteristics retained will generally range from about 5% to about 20% by weight of said liquid present in the substrate prior to drying, although a larger amount of retained liquid may be acceptable for particular composite membrane purposes. Those skilled in the art will appreciate that combinations of solvent and non-solvent liquids should be selected so that the relative volatilities of the components are such that the residual liquid present upon completion of the partial drying step does not contain an amount of non-solvent liquid in excess of that desired for a given composite membrane-fluid separation operation.

In those embodiments in which a combination of solvent and non-solvent components are present in the residual liquid retained upon partial drying, the proportions of such components can be varied in any desired manner depending upon the membrane separation layer and substrate materials employed, and the operating and performance requirements of any given gas separation operation. For some common operations, it has been found desirable to employ a residual liquid comprising a solvent containing a non-solvent as well, e.g. a residual liquid containing about 50% by weight alcohol and 50% water (non-solvent).

The composite membranes prepared as herein described and claimed are capable of essentially exhibiting the selectivity of the coating material, together with enhanced permeability characteristics and an advantageous combination of selectivity and permeability for desirable gas or other fluid separation operations. Such desirable results are achieved as a result of the substantially non-occlusive nature of the separation layer with respect to the substrate resulting from of the retention of residual liquid in the pores of the substrate upon the partial drying thereof. Thus, the coating will not appreciably penetrate into the pores of the support layer. As a result thereof, the separation layer can be made desirably thin. It should be noted that said separation layer deposited under the unique conditions resulting from said partial drying step is also potentially asymmetric in nature, particularly when non-solvent is incorporated into the partially dried substrate. As the proportion of the non-solvent component in the residual liquid is increased, it becomes more likely that the separation layer formed will be of asymmetric character. It will be understood that such asymmetric character of the separation layer is such that a relatively porous region thereof is created adjacent the substrate layer, with a less porous, more dense, outer skin region being formed adjacent the outer surface of said separation layer. Such asymmetric nature of the separation layer, if it is formed, will be seen to further enhance the permeability rate of the more readily permeable component of a fluid mixture. Thus, the separation region of the thin separation layer is confined, to a substantial extent, to the less porous outer skin portion of said layer, with the increased porosity of the remaining portion of the separation layer enabling the composite membrane to exhibit significantly higher permeability characteristics than is achieved in conventional composite membranes not prepared in accordance with the invention. The non-occlusive nature of the separation layer will also be understood to enhance the permeability characteristics of the membrane by obviating the passage of the separation layer material into the pores and like occlusions in the outer surface region of the substrate coated with said material.

It will be understood from the above that the substrate layer of composite membranes is generally porous in nature and essentially not of asymmetric character. The polysulfone hollow fibers generally preferred as the substrate material in the practice of the invention, and other suitable substrates, will typically have a surface porosity in excess of $10^{-3}$ of the total surface area, while asymmetric membranes will typically have a surface porosity of less than $10^{-6}$. Those skilled in the art will appreciate that the surface porosity of the desired substrate can be adjusted by variation of the operating conditions pertaining to the formation of the substrate. In the production of polysulfone or other hollow fibers, for example, the surface porosity of such fibers will be determined by the composition of the casting solution, the temperature employed, and other process parameters, such as the length of the air gap employed in dry-wet spinning procedures, the rate of spinning, the fiber draw ratio, and the like.

The invention is further described herein with reference to additional illustrative examples of the partial drying feature of the invention as employed for representative air separation operations. In such examples, the permeability is expressed in $ft.^3(STP)/ft.^2 \cdot day \cdot psi$, and the selectivity is as defined above. The % of residual liquid is expressed as the weight % of the liquid contained in the support layer per weight of liquid of the support layer in substantially wet form. In such examples, polysulfone fibers were spun, quenched and washed with water. The fibers were then immersed in and equilibrated with a let off solution, i.e. the liquid from which it was intended to partially dry the fibers in the practice of the invention. The fibers were passed through a drying oven to achieve a desired partially dried condition. The fibers were then coated and were passed through a drying oven and a cure oven before being taken up on a winder. The coated hollow fibers were further constructed into a hollow fiber separatory module in accordance with known procedures for convenient use in gas separation operations. Separate experiments were conducted to determine the residual liquid remaining after the partial drying step of the invention. For this purpose, sample fibers were collected for moisture analysis, prior to coating. The moist fiber was immediately weighed and was dried in a 130° C. oven overnight to a constant weight and cooled. The fully dried fiber was then weighed. The amount of moisture was determined by difference in weight.

EXAMPLE 2

Freshly spun polysulfone hollow fibers were saturated with a 50/50 wt. % isopropanol/water let off solution, and were partially dried under conditions as noted in Table I, prior to being coated with a 1% ethyl cellulose in isopropanol solution (wt. by vol. %, i.e. 1 gr. of ethyl cellulose in 100 cc. of isopropanol). The fibers were constructed into separation modules and tested for separation of air at 100 psig and close to a 0% stage out. The permeation and separation characteristics of the thus prepared composite membrane were as set forth in Table I.

TABLE I

| % Residual Liquid | Permeability $(ft.^3(STP)/ft.^2day.psi.)$ | Selectivity $(O^2/N^2)$ | Partial Drying Conditions Temp.°C. |
|---|---|---|---|
| 100 | 1.5 | 1.1 | no predrying |
| 87 | .38 | 3.7 | 21 |
| 58.5 | .36 | 3.8 | 22 |
| 39.4 | .33 | 3.8 | 30 |
| 16 | .28 | 3.8 | 40 |
| 6.4 | 0.23 | 3.9 | 50 |

By contrast, in the conventional approach in which the hollow fibers are completely dried prior to coating, as in Example 1 above, the selectivity was about 3.8 and the permeability was 0.23. Fibers coated while in a fully wet condition exhibited a more than three-fold increase in permeability, but with an unacceptably sharp decrease in separation characteristics to a selectivity of about 1 as can be seen from line 1 of Table I above.

EXAMPLE 3

The experiments as in Example 2 were repeated except that the 50/50 wt. % isopropanol/water let off solution was replaced with a 95/5 wt. % isopropanol/water, and the fibers were partially dried in the 20°–50° C. temperature range. Optimum results were achieved at partial drying conditions of about 22° C. The thus-partially dried composite hollow fibers exhibited a selectivity of 3.9 and a permeability of 0.33, showing a substantial improvement over the results obtained using completely dried fiber, but less desirable results than were obtained using the 50/50 isopropanol/water solution.

To further illustrate the significance of partial drying conditions, supplemental runs were carried out by coating 1% ethyl cellulose in isopropanol on polysulfone hollow fibers that were partially dried from pure water (non-solvent) let off in one instance and pure isopropanol (solvent) let off in another. The partial drying step was carried out at 50° F. and 30° F., respectively, so as to retain a residual liquid content of about 95% by weight in each instance. The permeability was significantly- increased in each instance, i.e. to 0.80 and 0.75, but with a decrease in selectivity to about 2.3.

The invention will be seen to enable the desirable separation characteristics of coating materials to be utilized to advantage in composite membranes having acceptable and, in preferred embodiments, enhanced permeability characteristics. It will be appreciated from the discussion above that the highly advantageous combination of selectivity and permeability obtainable with ethyl cellulose/polysulfone hollow fiber composite membranes can be achieved using other composite hollow fiber compositions and other forms of composite membrane structure. While the use of hollow fibers is generally preferred, composite membranes can be prepared in accordance with the invention in spiral wound, plate and frame or other desired form. Similarly, other membrane and substrate materials can be employed to produce composites membranes in the practice of the invention. Illustrative examples of other suitable membrane materials include cellulose acetate, polyacrylates, e.g. polymethylmethacrylate, polyarylates, e.g. polyphenylene oxide, and sulfonated polyarylates, e.g. sulfonated polysulfone, sulfonated polyethersulfone, and sulfonated polyetheretherketone. While a variety of other polymeric materials, such as cellulose acetate, polyphenylene sulfide, etc., can be used for the substrate of the composite membrane, polysulfone is the generally preferred material for this purpose. It will be understood that the composite membranes of the invention can be used for a wide variety- of practical commercial gas separations, including air separation, the recovery of hydrogen from ammonia purge gas and from refinery streams, carbon dioxide-methane and helium-nitrogen separations and the like. The composite membranes of the invention can also be used in practical commercial pervaporation or perstruction separation operations.

It will be understood that various changes and modifications can be made in the details of the process of the invention without departing from the scope of the invention as set forth in the appended claims. For example, a number of washing steps may be employed prior to commencing the partial drying and coating operations in the preparation of the composite membrane. While water is commonly used to quench and wash polysulfone hollow fibers, other liquids may be used for this purpose, and a variety of let off liquids can be used for the wetting of the substrate prior to the partial drying step of the invention.

In the practice of the invention it will be understood that the separation layer will comprise a very thin coating layer of the desired membrane material. In general, the separation layer will be about 0.4 microns or less in thickness, with thicknesses in the range of about 0.02 to about 0.2 microns being typically preferred.

It should be noted that the invention can be practiced in embodiments in which the washing of the support layer, as described above, is not an integral part of the support layer preparation operation. As those skilled in the art will appreciate, the support layer may be prepared by wet spinning, dry spinning, dry-wet spinning and melt spinning techniques. In applications in which the support layer is spun or extracted in dry form with the solvent having been evaporated, there is obviously no need to carry out a washing step for the extraction of solvents from said support layer. In such instances, the dry support layer is wetted out with an appropriate solvent let off solution and then partially dried prior to coating. It should be further noted that it is also within the scope of the invention that the controlled amount of desired liquid to be incorporated into the substrate prior to coating can be added by condensing said liquid into the support layer prior to commencing the coating operation. Such condensation may be carried out in any desired manner, conveniently by passing the hollow fibers or other form of substrate layers through a saturated vapor of the desired liquid at a suitable temperature, to promote the desired condensation of liquid into the substrate layer. The time of exposure and the partial pressure of the vapor can be adjusted for a given application to control the amount of liquid added to the dry substrate. In all of the embodiments of the invention as herein disclosed and claimed, it will be understood that the amount of liquid maintained in the separation or substrate layer prior to coating will be within the range indicated above with respect to the washing and partial drying embodiments of the invention.

The separation layer formed in the practice of the invention will be seen to provide an attractive response to the desire in the art for thinner and thinner membrane separation layers. When composite membranes are prepared as herein disclosed and claimed, it is possible to create a coating of a non-occlusive nature, and potentially of an asymmetric nature, on a hollow fiber or other suitable substrate. As a result, very thin separation layers can be utilized to achieve the desired separation characteristics of the membrane material and advantageous combinations of selectivity and permeability. In addition, if substantial asymmetry is developed in the separation layer, the thickness of the coating can be increased appreciably over the thicknesses indicated above without adversely affecting the beneficially high permeation rates obtainable in the practice of the invention. By the achieving of these desired properties, the invention enhances the prospects for an ever-increasing utilization of permeable membranes in commercially significant gas separation operations.

We claim:

1. In the process of preparing a composite membrane capable of selectively permeating a more readily permeable component of a gas mixture in gas separation operations and having a separation layer that determines the separation characteristics of the membrane and a porous support layer, the improvement comprising:
    (a) coating the porous support layer with a wet separation layer of membrane material, said support layer containing a controlled amount of liquid in the range of from about 10% to about 90% by weight of the liquid present in said support layer in fully wet form, said liquid being a solvent or non-solvent for the material of the separation layer; and
    (b) drying said separation layer on the porous support layer, the presence of said liquid in the porous support layer precluding any appreciable penetration of the membrane material into the pores of said porous support layer, the separation layer thereby being of a non-occlusive nature with enhanced permeation characteristics, and having thickness of about 0.4 microns or less, whereby the composite membrane exhibits essentially the separation characteristics of the very thin, non-occlusive membrane layer while achieving enhanced permeation and an advantageous combination of selectivity and permeability for the desired gas separation operations.

2. The process of claim 1 in which the controlled amount of liquid is incorporated into the essentially dry support layer prior to coating.

3. The process of claim 1 and including (1) substantially wetting the support layer with said solvent or non-solvent liquid, and (2) partially drying the wet support layer so as to retain said controlled amount of residual liquid therein prior to coating.

4. The process of claim 1 and including (1) washing said support layer for the extraction of casting solvents therefrom, the liquid used in the last portion of said washing step being the liquid to be contained in the support layer upon the coating thereof, and (2) partially drying the wet support layer so as to retain said controlled amount of residual liquid therein prior to coating.

5. The process of claim 1 in which the separation layer comprises a polymeric material.

6. The process of claim 1 in which the controlled amount of liquid is from about 40% to about 60% by weight of the liquid present in the support layer in fully wet form.

7. The process of claim 1 in which said liquid contained in the support layer is a solvent for the membrane material of the separation layer.

8. The process of claim 1 in which said liquid contained in the support layer comprises a mixture of solvent and non-solvent liquid with respect to the membrane material of the separation layer.

9. The process of claim 1 in which said liquid contained in the support layer is a non-solvent for the membrane material of the separation layer.

10. The process of claim 9 in which said liquid content is from about 5% to about 20% by weight of the liquid present in the support layer in fully wet form.

11. The process of claim 8 in which said liquid comprises a mixture of isopropanol and water.

12. The process of claim 9 in which said non-solvent liquid comprises hexane or water.

13. The process of claim 5 in which said separation layer comprises ethyl cellulose and said support layer comprises polysulfone.

14. The process of claim 5 in which said composite membrane is in hollow fiber form.

15. The process of claim 5 in which said separation layer comprises cellulose acetate and said support layer comprises polysulfone.

16. The process of claim 13 in which said composite membrane is in hollow fiber form.

17. The process of claim 8 in which the non-occlusive separation layer is of an asymmetric nature with a less dense region adjacent to the outer surface of the support layer and a more dense outer region adjacent to the outer surface of said separation layer.

18. The process of claim 9 in which the non-occlusive separation layer is of an asymmetric nature with a less dense region adjacent to the outer surface of the support layer and a more dense outer region adjacent to the outer surface of said separation layer.

* * * * *